United States Patent [19]

Shamma

[11] E Re. 29,490

[45] Reissued Dec. 6, 1977

[54] SYSTEM FOR ELECTRONIC MODIFICATION OF SOUND

[76] Inventor: Ramzi A. Shamma, 1808 Chapel Hill Road, Durham, N.C. 27707

[21] Appl. No.: 730,066

[22] Filed: Oct. 6, 1976

Related U.S. Patent Documents

Reissue of:

[64] Patent No.: 3,848,092
Issued: Nov. 12, 1974
Appl. No.: 375,366
Filed: July 2, 1973

U.S. Applications:

[63] Continuation-in-part of Ser. No. 191,632, Oct. 22, 1971, abandoned, which is a continuation of Ser. No. 74,869, Sept. 23, 1970, abandoned, which is a continuation of Ser. No. 701,987, Jan. 31, 1968, abandoned.

[51] Int. Cl.[2] ..... H04C 3/12

[52] U.S. Cl. ..... 179/1 VL; 179/1 GP; 84/1.27

[58] Field of Search ..... 179/1 VL, 1 GP, 1 G, 179/1 GQ, 100.1 R, 100.4 ST; 84/1.25, 1.27; 307/255; 338/116

[56] References Cited

U.S. PATENT DOCUMENTS

| | | | |
|---|---|---|---|
| 2,364,728 | 12/1944 | Leece | 338/116 |
| 2,714,633 | 8/1955 | Fine | 179/15 |
| 2,838,608 | 6/1958 | Athey et al. | 179/1 GP |
| 3,056,854 | 10/1962 | Katzenstein et al. | 179/1 GP |
| 3,272,906 | 9/1966 | De Vries et al. | 84/1.25 |
| 3,281,784 | 10/1966 | Farthing | 307/255 |
| 3,359,433 | 12/1967 | Thauland | 307/243 |
| 3,397,286 | 8/1968 | Prewitt et al. | 179/1 G |

*Primary Examiner*—Douglas W. Olms
*Attorney, Agent, or Firm*—Hopgood, Calimafde, Kalil, Blaustein & Liberman

[57] ABSTRACT

An audio amplifier provides an output signal to drive a pair of spaced loudspeakers. A signal distributor is connected between the amplifier output and the loudspeakers and distributes the amplified audio signal in different, varying proportions to the two speakers in accordance with a control signal at a frequency which is above the audio range and which is superimposed on the audio signal recorded on the recording medium. The apparent sound source is shifted back and forth between the speakers according to the preselected pattern of the control signal to create a pleasurable listening experience for the listener. In an alternate embodiment of the invention, the overall gain of the audio amplifier is also varied in accordance with a second control signal superimposed on the audio signal at a frequency above the audio range to create a still different and pleasurable listening effect to the listener.

8 Claims, 14 Drawing Figures

INVENTOR
RAMZI A. SHAMMA

BY
Hopgood & Calimafde
ATTORNEYS

Fig. 4A.
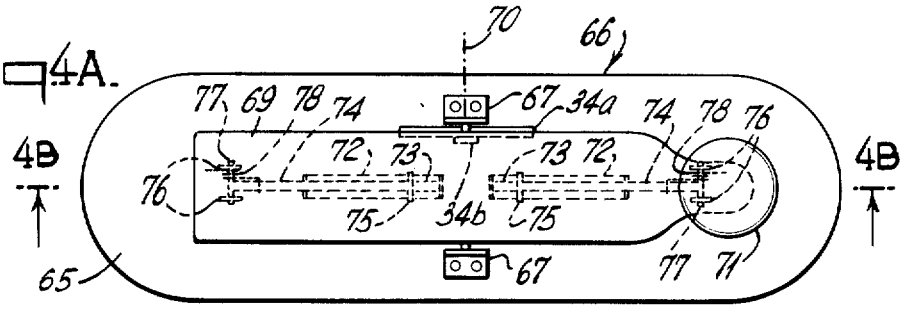
Fig. 4B.
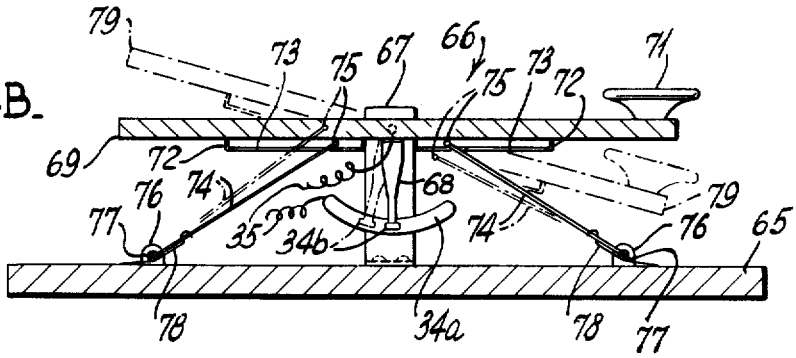
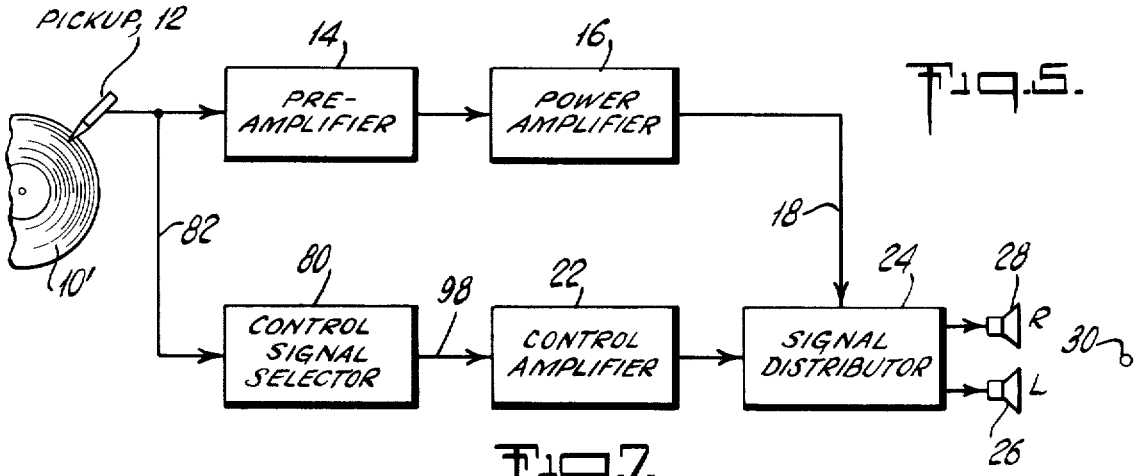
Fig. 5.
Fig. 7.
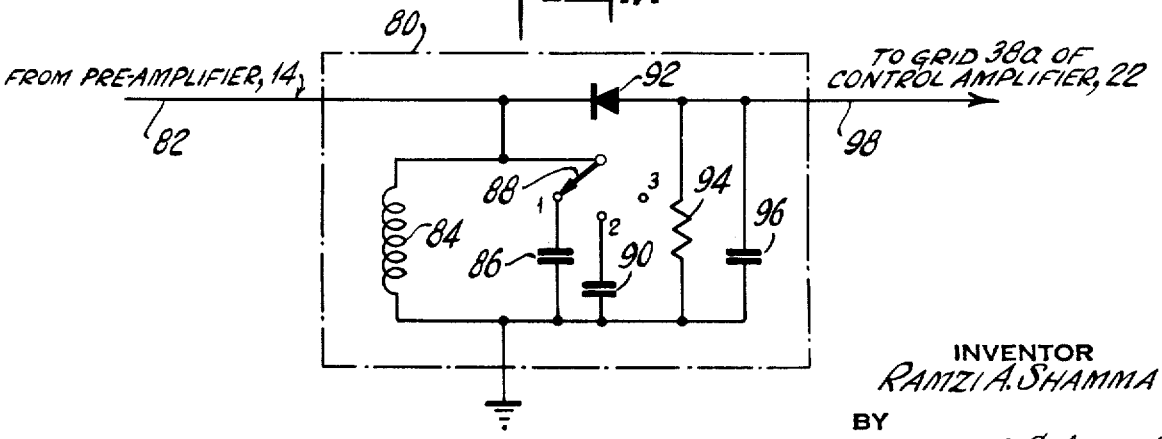
INVENTOR
RAMZI A. SHAMMA
BY
Hopgood & Calimafde
ATTORNEYS INVENTOR
RAMZI A. SHAMMA
BY
Hopgood & Calimafde
ATTORNEYS INVENTOR
RAMZI A. SHAMMA
BY
Hopgood & Calimafde
ATTORNEYS

| $V_{122}$ | TRANSISTOR, 126 $V_{b-e}$ | TRANSISTOR, 128 $V_{b-e}$ | SPEAKER POWER DISTRIBUTION |
|---|---|---|---|
| 1 VOLT | +6 VOLTS | -2 VOLTS | LEFT, 26 -MIN. RIGHT, 28 -MAX. |
| 3 VOLTS | +4 VOLTS | -4 VOLTS | LEFT & RIGHT EQUAL POWER |
| 5 VOLTS | +2 VOLTS | -6 VOLTS | LEFT, 26 - MAX. RIGHT, 28 -MIN. |

INVENTOR
RAMZI A. SHAMMA

BY
Hopgood & Calimafde
ATTORNEYS

SYSTEM FOR ELECTRONIC MODIFICATION OF SOUND

Matter enclosed in heavy brackets [ ] appears in the original patent but forms no part of this reissue specification; matter printed in italics indicates the additions made by reissue.

This is continuation in part of co-pending application Ser. No. 191,632, filed Oct. 22, 1971 now abandoned, which was a continuation of Ser. No. 74,869, filed Sept. 23, 1970, now abandoned; which was a continuation of Ser. No. 701,987, filed Jan. 31, 1968, now abandoned.

BACKGROUND OF THE INVENTION

In the continuing development of sound systems in recent years, considerable effort has been expended to provide apparatus for improving the reproduction of music and speech. However, these efforts have generally been directed at improving fidelity so that the program heard sounds as nearly as possible like the original "live" performance.

I have discovered that by deliberately modifying the original program material in a desired manner, an entirely new and pleasing type of sound reproduction is produced by which an entirely new dimension in listening pleasure is experienced by the listener.

It is an object of this invention to provide an entirely new type of pleasurable musical experience to the listener.

Another object is to provide a system in which recorded conventional music can be modified to present the same music to a listener with an entirely different dimension in sound.

Yet another object is to produce sound from a pair of speakers spaced apart from each other in such a manner that the sound appears to emanate from either speaker or to any apparent source between the speakers and in such a manner that said source may shift back and forth between the speakers.

To the accomplishment of the above and to such further objects as may hereinafter appear, the present invention relates to a system for electronic modification of sound, substantially as defined in the appended claims and as described in the following specification taken together with the accompanying drawings in which:

Figure 1:
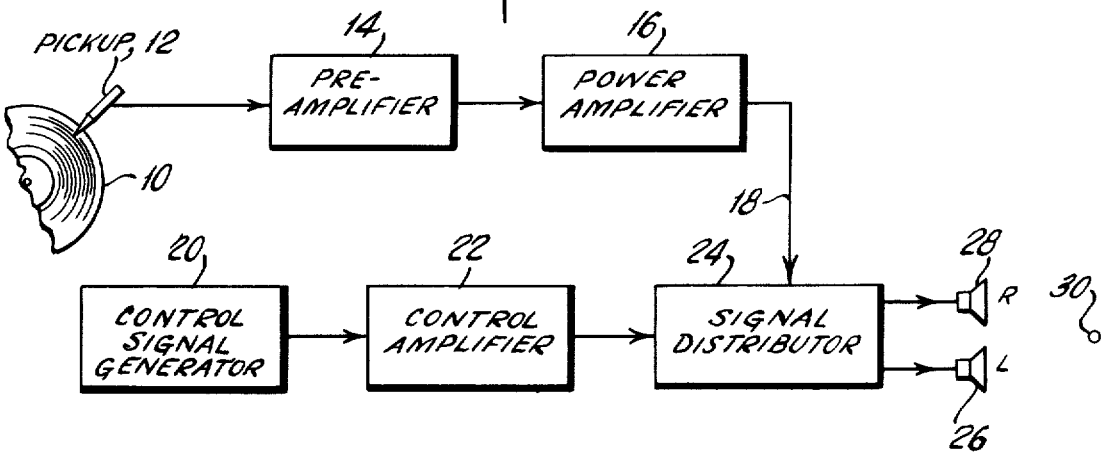
FIG. 1 is a block diagram illustrating a sound reproduction system according to one embodiment of this invention.
Figure 2:
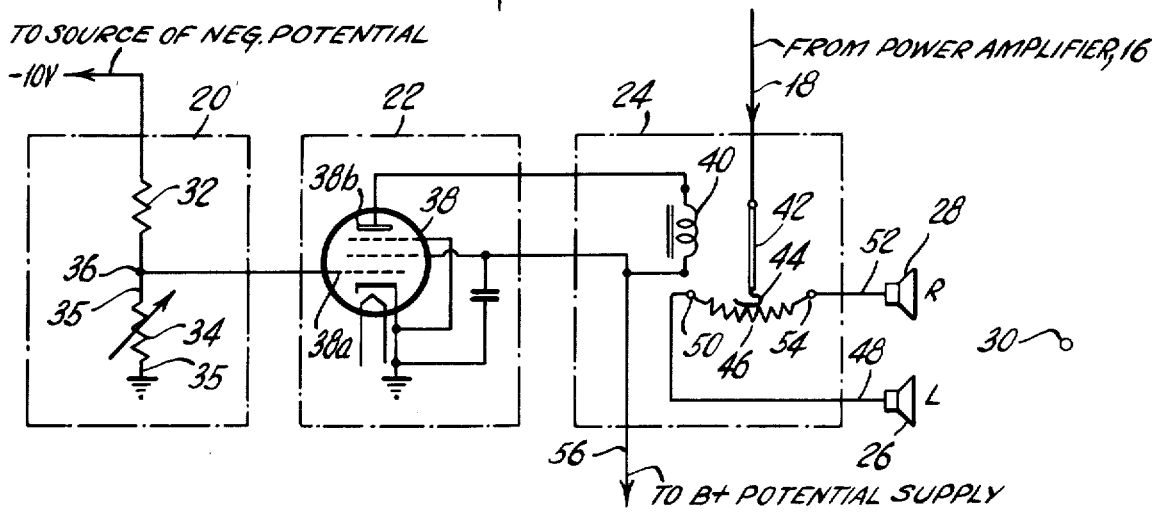
FIG. 2 is an illustrative schematic wiring diagram of a portion of the system shown in FIG. 1.
Figure 3A:
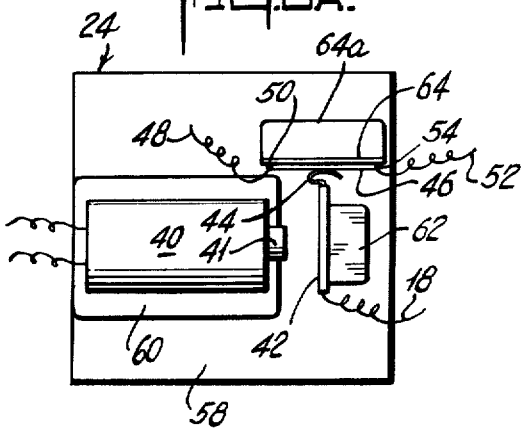
FIGS. 3A and 3B show one embodiment of a signal distributor which forms an integral part of this invention, the same being connected in the circuit of FIG. 2.
Figure 3B:
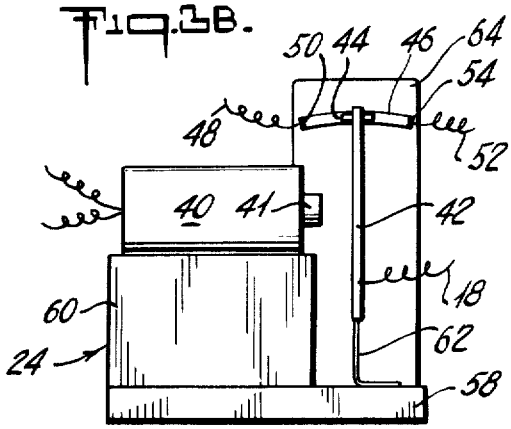
Figure 6A:
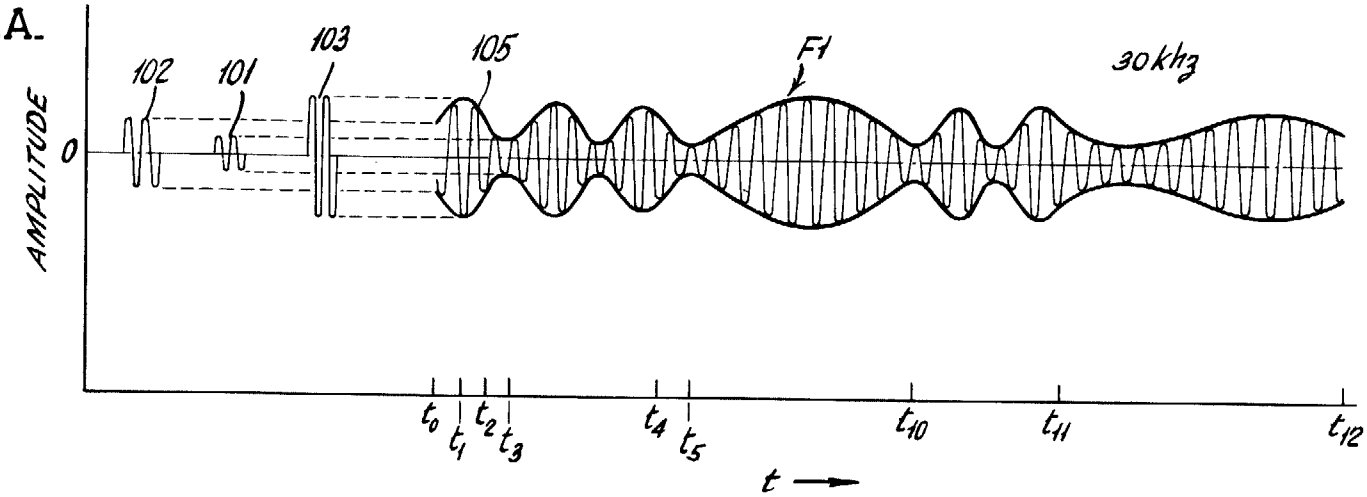
Figure 6B:
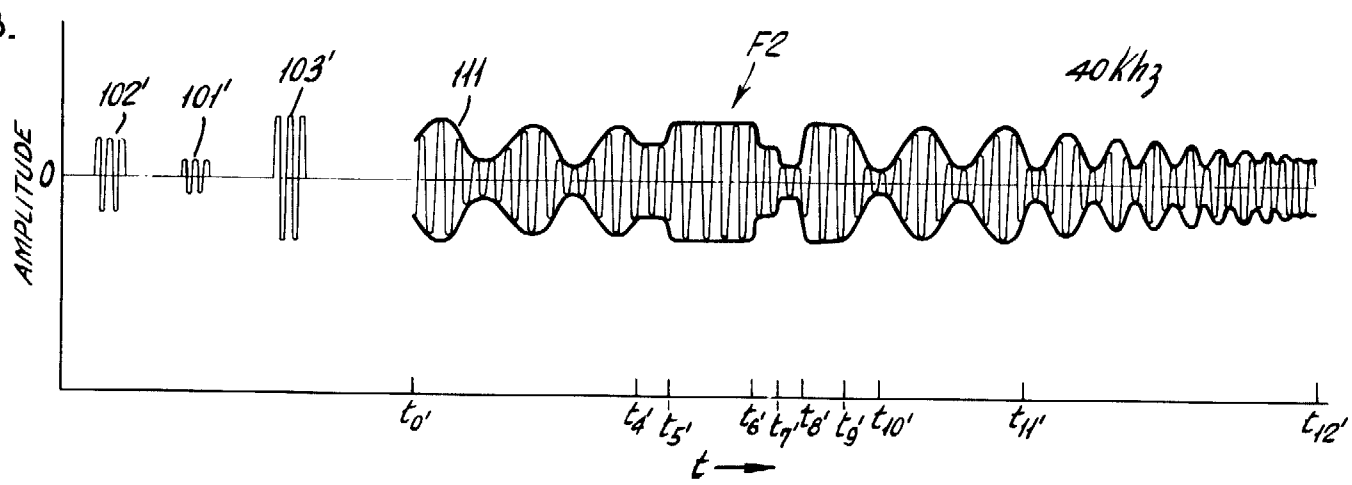
Figure 8:
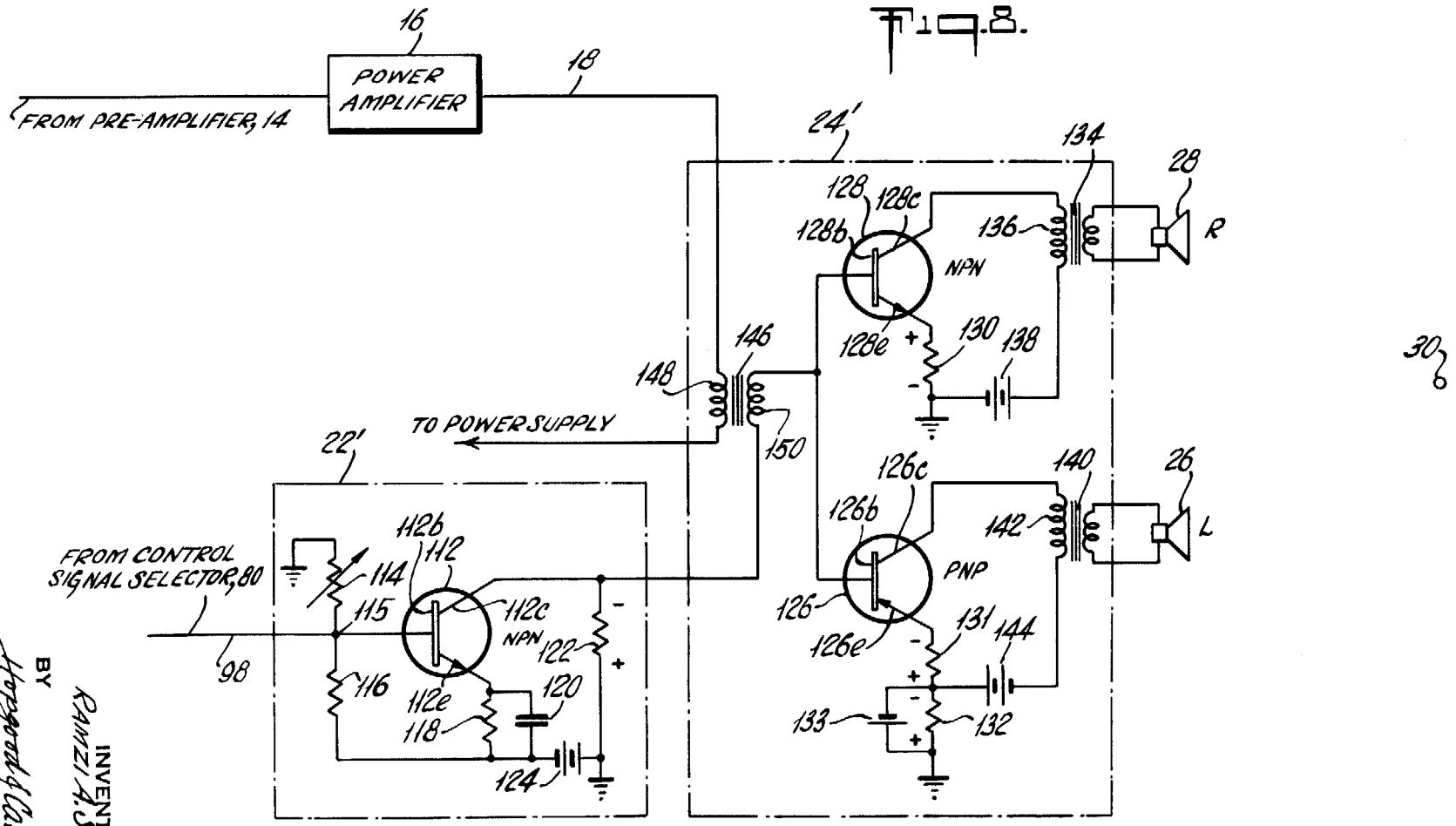
Figures 9, 10:
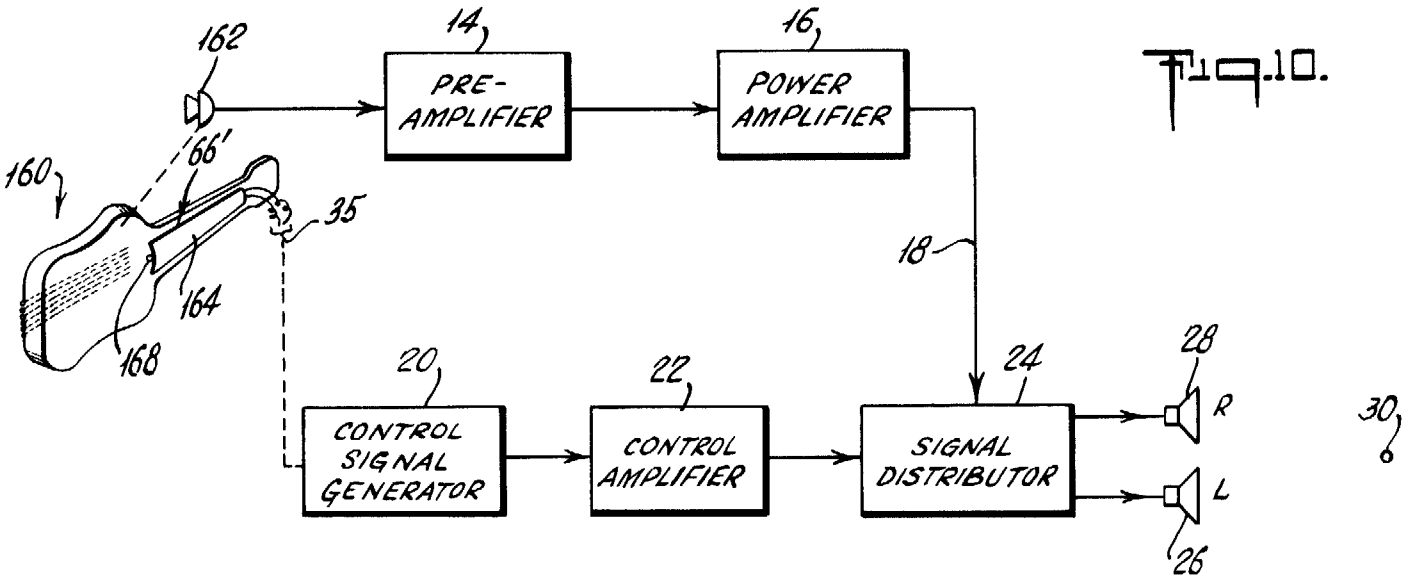
Figure 11:
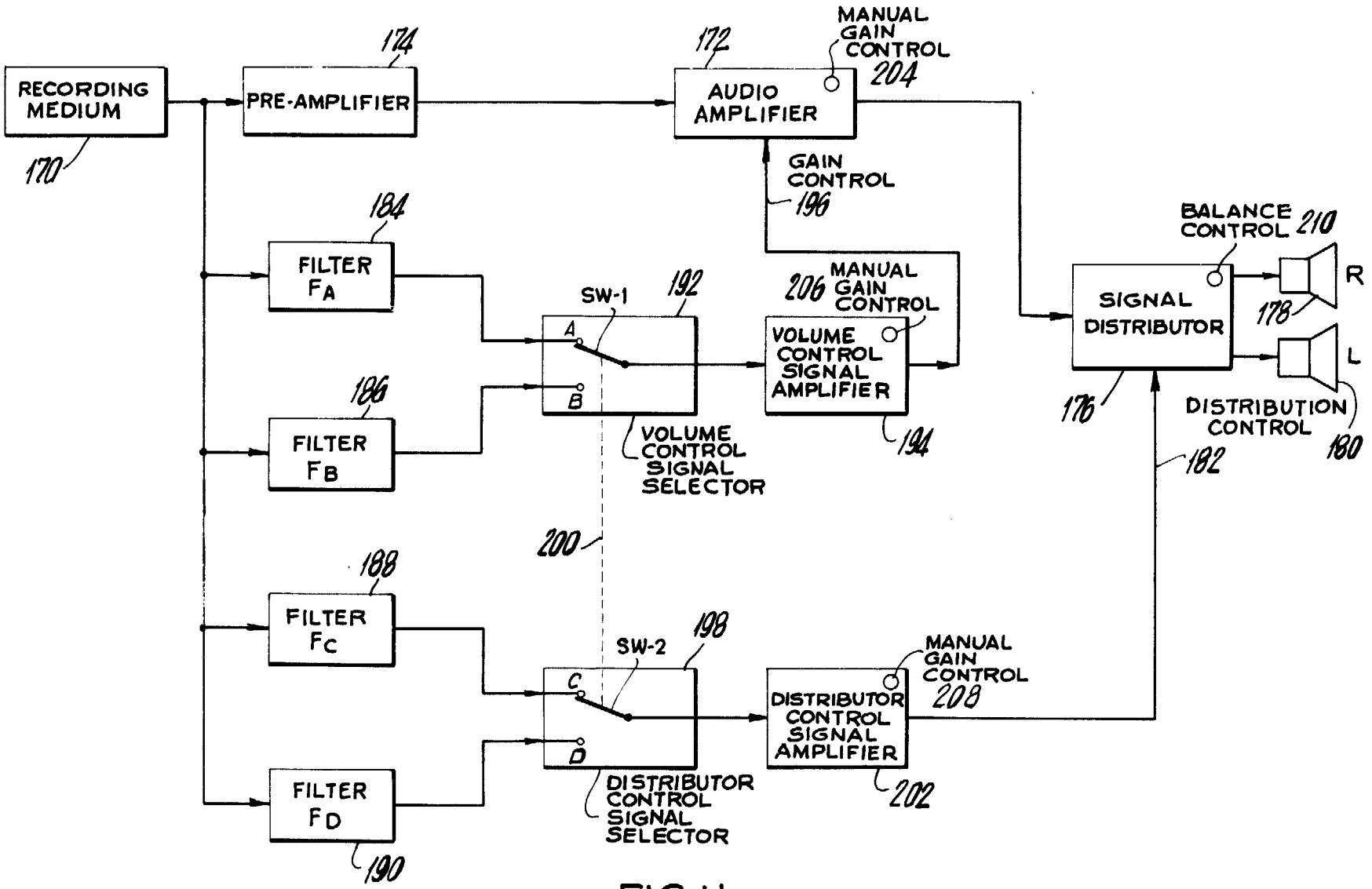

FIG. 4A illustratives a top view of one form of a mechanism that may be used in conjunction with the circuit of FIG. 2 to generate a control signal;

FIG. 4B is a side view of the mechanism of FIG. 4A, taken along the line 4B—4B thereof;

FIG. 5 shows in block diagram form another embodiment of this invention which employs a system similar to that of FIG. 1, but with a control signal selector for deriving the control signal from a recording medium;

FIGS. 6A and 6B illustrate wave-form diagrams useful in explaining the operation of the embodiment of the invention seen in FIGS. 5 and 7;

FIG. 7 illustrates one form of a control signal selector circuit used in the system of FIG. 5;

FIG. 8 illustrates one form of a transistor distributor circuit which can be employed in lieu of the mechanical signal distributor used in FIGS. 1 and 2 and seen in detail in FIGS. 3A and 3B;

FIG. 9 is a chart of potential values at different points in the circuit of FIG. 8 useful in explaining the operation of the transistor distributor circuit shown therein;

FIG. 10 illustrates an embodiment of the invention particularly useful for individual musical instruments; and FIG. 11 is a schematic diagram of an alternative embodiment of the invention which further includes means for varying the gain of the audio amplifier in accordance with a preselected pattern.

SUMMARY OF THE INVENTION

Briefly, this invention includes electronic amplifier means for amplifying a signal representative of music or other types program material, a pair of loudspeakers spatially connected between the output of the amplifier and the speakers, and means to control the distributor in such a manner that the amplifier output is fed to the speakers in different and varying proportions to produce a novel and pleasing listening experience created by the illusion of a sound source shifting or floating back and forth between the speakers, the shifting and floating characteristics depending upon the particular control signal characteristics used to actuate the distributor.

In one embodiment of the invention, the distribution of the amplifier output to the two speakers is controlled by a manually operated signal generator, which controls the signal distributor. In this embodiment, the program material may be either "live" or recorded. In another embodiment, the program material is derived from a recording medium and the distributor is controlled by a control signal which is recorded with the program and which is separated from the program material by a suitable signal separation circuit.

DESCRIPTION OF PREFERRED EMBODIMENT

Referring now to FIG. 1, there is shown a system for reproducing sound in accordance with one embodiment of this invention. This system includes a source of program material, which may be "live," or may be a recording such as the record 10, a signal generating device such as a pickup 12, a preamplifier 14 and a power amplifier 16, all of which may be conventional components in this embodiment. The audio output signal from the power amplifier 16 is fed on a line 18 to a signal distributor 24, which distributes a portion of the audio signal to a left loudspeaker 26 and a portion to a right loudspeaker 28 spaced therefrom. The signal distributor 24 is controlled by means of a control signal generator 20, which develops a control signal that is amplified by a control amplifier 22 to a level sufficient to operate the distributor.

FIG. 2 shows a schematic wiring diagram of a portion of the system of FIG. 1 which includes the control signal generator 20, the control amplifier 22, the signal distriutor 24 and the speakers 26 and 28. The control signal generator 20 may take several forms, one preferred form comprising a voltage divider, including a fixed resistor 32 and a variable resistor 34, connected to any suitable source of negative potential, such as a 10 volt D.C. source. This voltage divider provides a variable biasing potential at the junction 36 when the resistor 34 is varied and this variable potential comprises the control signal which actuates the signal distributor 24.

This control signal is fed to the control amplifier 22 which employs a pentode tube 38 having a control grid 38a for receiving the control signal from the junction 36 in the control signal generator 20. This tube 38 employs conventional circuitry and amplifiers the control signal at the junction 36, this amplified signal then being fed to the signal distributor 24.

The signal distributor 24, in the embodiment of the invention shown in FIGS. 1 and 2, comprises a magnetically-actuated power distribution potentiometer including a coil 40 for actuating an armature 42 to cause a contact 44 thereon to change position on a resistance element 46. The left speaker 26 is connected by a wire 48 to a contact 50 on one end of the resistance element 46 and the right speaker 28 is connected by another wire 52 to a contact 54 on the other end of the resistance element. Further details of the signal distributor 24 are seen in FIGS. 3A and 3B, to be discussed hereinafter.

The signal distributor coil 40 is connected between the plate 38b of the tube 38 and the potential supply lead 56. Accordingly, it will be appreciated that a variation in the input signal to the tube 38 will vary the output therefrom and cause a commensurate movement of the armature 42. This will move the contact 44 on the resistance element 46, causing an increase in the resistance between the line 18 and one of the speakers 26–28 and a decrease in the resistance between the line 18 and the other speaker, thus changing the distribution of energy to the speakers. Such changes, when of the proper timing and amplitude, will provide a listener positioned at the location 30 between the two speakers, with a very pleasing aural experience heretofore unknown. Further description in this connection will be given under the detailed description of operation below.

FIGS. 3A and 3B shows the mechanical details of the signal distributor 24 seen in FIG. 2. From these figures it will be seen that the basic electromagnetic unit, which includes the coil 40 and armature 42, is of the relay type, the coil 40 being wound on a soft iron core 41. The unit is mounted on a base 58 with the coil 40 positioned on a pedestal 60. The armature 42 is mounted on the base 58 for side-to-side movement on a leaf spring 62, and for simplicity is shown in the center position in FIGS. 3A and 3B corresponding to that seen in FIG. 2, which corresponds to the zero signal bias condition on the control amplifier 22. At rest, the armature contact 44 actually engages the contact 54. The resistance element 46 is secured to a suitable mounting bracket 64, affixed to the base 58 by a lower portion 64a thereof.

FIGS. 4A and 4B show one form of a mechanism 66 that may be employed as a part of the control signal generator 20 of FIGS. 1 and 2 and which includes the variable resistor 34 shown therein. This variable resistor 34 includes in FIGS. 4A and 4B, an arcuate shaped resistance element 34a, mounted on one of a pair of brackets 67 on a base 65, in conjunction with a sliding contact 34b, arranged to move over the surface of the element 34a. The sliding contact 34b is fixed to one end of an arm 68, which is fixed to a lever 69 mounted for pivotal movement on the brackets 67 about an axis 70. The wires 35 comprise end leads for the variable resistor 34a, 34b. The lever 69 is operated manually by grasping the finger-engaging member 71; alternatively, the member 71 may be eliminated and the palm of the hand may be placed over the lever 69 to rock the same about the axis 70, to vary the resistance between the wires 35.

The bottom of the lever 69 is provided with track-forming members 72, each having slots 73 therein. Elongated rigid structural members 74 are arranged to slide at their upper ends along their respective slots 73 and are retained against falling out of their slots by suitable retaining means such as transverse end members 75. The lower ends of the rigid members 74 are mounted for pivotal movement on sets of apertured brackets 76 on the base 65 by means of pins 77 connected to these members. Helical springs 78 are provided at the pins 77 to provide damping and also to insure a given "at rest" position of the lever 69 and sliding contact 34b, as seen in solid lines in FIG. 4B when no finger pressure is applied to the member 71 on the lever. If desired, this "at rest" position may be made changeable by a spring adjustment, or by providing suitable means for setting the resistance element 34b in slightly different positions along the arcuate path of the contact 34b.

Referring now to FIGS. 1–4, the manner of operation of the first embodiment of this invention will be described with the record 10 having music recorded thereon. When the record 10 is played, the preamplifier 14 and the power amplifier 16 will amplify the signal generated by the pickup 12 and feed it to the signal distributor 24. With the armature 42 (FIGS. 2, 3A and 3B) in the center position shown, the resistance between the sliding contact 44 and the one terminal 50 of the resistance 46 will be equal to that between the contact 44 and the other terminal 54. Accordingly, the power fed from the line 18 through the armature to each speaker 26 and 28 will be equal. Thus a person listening at the location 30 will hear an equal volume of sound from each speaker and the location of the apparent sound source will be located midway between the speakers 26–28.

In accordance with the first embodiment of this invention, however, the sound emanating from the speakers 26–28 may be varied so that the volume of sound from the left speaker 26 is first decreased while that from the right speaker 28 is increased and then vice versa. During these changes the total sound output from the two speakers will remain substantially constant. These changes are achieved by lowering and raising the lever 69 of the mechanism 66 seen in FIGS. 4A and 4B, which is connected as a part of the control signal generator 20 by the wires 35 to form the variable resistor 34. It will be clear that such motion of the lever 69 of the mechanism 66 will vary the resistance between the wires 35, thus changing the potential on the junction 36 of FIG. 2 and causing the output of the tube 38 to vary, thereby varing the position of the distributor armature 42. The movement of this armature 42 will follow faithfully the excursions of the lever 69 of the mechanisms 66. Thus for each downward movement of the member 71 by the listener, as represented, for example, by the position of the lever 69 shown in dashed lines and indicated by the numeral 79, the armature 42 will move to the right and will increase the volume from the right speaker 28 while decreasing the volume from the left speaker 26. When the member 71 is raised, however, the reverse effect will be produced, i.e., the volume of the right speaker 28 will decrease and that of the left speaker 26 will increase. The effect of such volume increase and decrease in alternate speakers is to create the very pleasant illusion of a movable sound source shifting or "floating" back and forth between the speakers 26–28, the particular characteristics of these excursions depending upon the precise manner of operation of the lever 69. After a short amount of experience, the listener-operator will be able to cause the sound to "float" back and forth between the speakers in a very pleasant manner, the speed of the excursion and the time period between excursions being selected at will to blend the musical tempo together with the listener's mood and preference. When the listener wishes to hear the music without these effects, he simply takes his hand off the lever 69, thus allowing the same to be returned to the "at rest" position, and the program with play exactly as it was recorded with no motion of the apparent sound source located between the speakers.

FIG. 5 shows a sound system in accordance with a second embodiment of the invention. It will be seen that this system is very similar to that of FIG. 1, but that a control signal selector 80 is provided in place of the specific control signal generator 20 of FIG. 1 and receives its input from a signal generator comprising the record 10' and the pickup 12, through a lead 82. If desired, the lead 82 could also be connected to the output of the preamplifier 14.

According to the embodiment of FIG. 5, the record 10' is different from the record 10 of FIG. 1. This record 10' contains a program source, such as music, and also a first modulated control signal F1 of an inaudible frequency, such as the 30 khz signal seen in FIG. 6A, and a second modulated control signal F2 of 40 khz, such as seen in FIG. 6B. These modulated control signals are generated by the pickup 12 along with the recorded music, the composite signal appearing on the input lead 82 to the control signal selector 80.

FIG. 7 shows one form of a circuit that can be employed as the control signal selector 80 to extract the first and second control signal frequencies F1 and F2 from the composite signal on the lead 82. This circuit comprises a first parallel resonant circuit, including an inductance 84 and a first capacitor 86, which is tuned to the F1 control signal frequency of 30 khz. A selector switch 88 is provided to select the 30 khz frequency signal when in position No. 1, and the 40 khz signal when in position No. 2. This second position places the inductance 84 in parallel with a second compacitor 90 to form a parallel resonant circuit tuned to the F2 control signal frequency of 40 khz. When in position No. 3, neither signal frequency is selected.

A detector diode 92 is provided in combination with a load resistor 94 and a capacitor 96 to demodulate whichever of the signals F1 or F2 that is selected, to develop an output control signal. This control signal is present on the lead 98 and is fed to the grid 38a of the control amplifier 22 of FIG. 2, which is also employed in the system of FIG. 5.

Unlike the embodiment of the invention shown in FIG. 1, which is operated manually, the embodiment seen in FIG. 5 operates automatically in accordance with variations in the inaudible modulated control signals F1 and F2 recorded in the sound track of the record 10'. These control signals ar pre-recorded in accordance with the selection of a musical expert, such as, for example, a music arranger. This is accomplished as the arranger listens to the music being played and may be achieved in a number of ways. One way is for the musical arranger to operate a suitable electronic circuit so that a 30 khz continuous control signal is superimposed on the music signal to be recorded. This 30 khz signal is modulated by the arranger in such a manner that when he wishes the music to play at equal volume through the speakers 26–28 of FIG. 5, the level is maintained at a given amplitude such as that indicated by the waveform 102 of FIG. 6A. When he wishes a greater volume of sound to emanate from the left speaker 26 and less volume from the right speaker 28, the amplitude will be reduced below said given value, as indicated by the waveform 101 of FIG. 6A.

Thus it will be appreciated that the arranger will cause the pre-recorded control signal on the record 10' to be amplitude-modulated in accordance with his expert knowledge and taste in music in order to produce the shifting or "floating" effect of the sound source back and forth between the speakers 26–28 when the music is reproduced thereby. Each of the wave F1 and F2 of FIGS. 6A and 6B denote modulated control signals which produce such effect. The means for recording these control signal waves F1 and F2 may comprise a 30 khz signal source, a 40 khz signal source, and means for modulating each of these signals frequencies in accordance with the arranger's preference. The arranger's modulation control may comprise a suitable manual variable resistance control, such as that shown in FIG. 4, for example.

The modulated control signal F2 has different amplitude vs. time characteristics than the modulated control signal F1 so that the listener, by means of the selector switch 88 of FIG. 7, may choose between the musical program reproduced according to the control signal F1 of FIG. 6A or the different program reproduced according to the control signal F2 of FIG. 6B. The music may also be played in the natural recorded mode by selecting the No. 3 switch position so that neither control signal is selected, in which case ordinary high fidelity reproduction results.

The embodiment of FIG. 5 operates in the manner now to be described. As the record 10' is played, the pickup 12 develops a composite signal comprising the recorded music signal and the modulated control signals F1 and F2 of FIGS. 6A and 6B respectively. This composite signal is amplified by the preamplifier 14 and the power amplifier 16 and carried on the lead 18 to the signal distributor for distribution to the speakers 26 and 28. The control signals F1 and F2, however, are not heard in the speakers because they are above the range of audibility.

The composite signal from the pickup 12 also appears on the lead 82 and is fed to the input of the control signal selector 80. From the details of FIG. 7 and the foregoing description, it will be appreciated that when the switch 88 is in the No. 1 position, the parallel LC circuit comprising the inductor 84 and capacitor 86 will be turned to the 30 khz control signal F1. This frequency will therefore be selected from the composite signal on the lead 82, while the 40 khz control signal F2 and the music signal will be rejected. The control signal F1 will therefore by demodulated by the diode 92, so that the modulation information on the control signal F1 is developed across the load resistor 94. This constitutes the control signal information and is indicated by the upper envelope curve 105 of the F1 wave in FIG. 6A. This control signal information potential 105 appears on the lead 98 and controls the conductivity, and therefore the output of the control amplifier 22. This control amplifier 22 and the signal distributor 24 function as described in connection with FIGS. 1 and 2 above.

Referring further to FIGS. 6A and 6B, it will be appreciated that when the control signal F1 has an amplitude modulation indicated by the height of the signal 102, the signal potential 105 across the resistor 94 of FIG. 7 has a given "center" value, causing the control amplifier 22 to "center" the signal distributor 24 so as to feed equal power to each of the speakers 26–28. Accordingly, the sound source will appear to the listener at the position 30 to exist midway between the speakers 26–28. This is the condition at the time $t_0$ in FIG. 6A. Between the times $t_0$ and $t_1$, however, the signal potential 105 across the load resistor 94 will become more positive, thus decreasing the negative bias on the grid 38a of the tube 38, see FIG. 2. This will cause an increase in the plate current of the tube 38, attracting the signal distributor armature 42 closer to the coil 40 so that more power is fed to the left speaker 26 and less to the right speaker 28. As this is a progressive process whereby the signal distributor follows the changes in signal potential 105 of FIG. 6A, the apparent music source between the speakers 26–28 appears to shift from the right [soeaker] *speaker* 28 toward the left speaker 26. From the foregoing, it will therefore be seen that the apparent music source will shift back to the center position between the time period $t_1 - t_2$ and will then continue toward the right speaker 28 during the time period $t_2 - t_3$ as the potential 105 drops below the amplitude of the waveform 102. This process will continue as long as the signal waveform 105 varies, as seen in FIG. 6A.

The rate of change of the movement of the apparent music source between the speakers 26–28 will, of course, vary depending upon the rate of change of the signal potential 105. Thus the shifting will be at similar recurring intervals between the time period $t_0 - t_5$, when the shift will then become more gradual between the period $t_5 - t_{10}$. Between the period $t_{10} - t_{11}$, a recurrence of the shifting frequency of the period $t_0 - t_5$ will occur and from the period $t_{11} - t_{12}$ a gradual shift will again occur, with the volume from each speaker 26–28 the same at time $t_{12}$ so that the apparent source seems to be located midway between the speakers.

FIG. 6B shows details of the control signal F2 which controls the same basic music program as that controlled by the signal F1 but in a different manner. This control signal F2 will control the operation of the signal distributor 24 when the selector switch 88 of FIG. 7 is in the No. 2 position, since the 40 khz parallel resonant circuit comprising the inductor 84 and capacitor 90 will then be operatively connected. Thus, simply by turning the selector switch 88 from position No. 1 to position No. 2, the listener will be able to enjoy the same basic music on the record 10', but shifted between the speakers 26–28 in an entirely different manner in accordance with the control signal F2.

The control signal F2 may be used to reproduce the same basic musical program in a slightly different manner, or in an entirely different manner, depending upon the nature of the music and the differences in the characteristics between the first control signal F2. It will be appreciated from FIG. 6B that the apparent music source will be shifted back and forth between the speakers 26–28 by the control signal F2 during the period $t_0' - t_4'$. Between $t_4'$ and $t_5'$ however, the music will emanate with equal volume from each speaker 26–28, and will then abruptly emanate chiefly from the left speaker 26, causing the apparent source to shift from the center toward this left speaker. Between the time period $t_5 - t_6'$ this unequal power distribution to the two speakers will remain constant, and will then at time $t_6'$ again change so that both speakers 26–28 again receive equal power, until time $t_7'$. At time $t_7'$ the apparent sound source will shift to the right, since more power is then distributed to the right speaker 28, and will be so maintained until time $t_8'$, the apparent source will shift from the extreme right to the extreme left and remain there until time $t_9'$. From $t_9'$ to $t_{11}'$, the "swinging" or "floating" shift that occurred from time $t_0'$ to $t_4'$ will again be produced. Then from time $t_{11}' - t_{12}'$ this shift will gradually become more rapid, while also shifting progressivey less with each shift, until at time $t_{12}'$ the shift is zero and once again each speaker emanates equal sound, placing the apparent sound source centrally between the speakers 26–28. The "floating" and shifting phenomena of the location of the apparent source between the speakers 26–28 thus achieved produces on the listener an entirely new dimension in the pleasurable experience of listening to music. It will be appreciated that an infinite number of different time and amplitude combinations can be employed for the control signals to produce commensurate variations in the reproduced music.

FIG. 8 shows a modification of the invention wherein a transistorized signal distributor 24' is employed in lieu of the mechanical signal distributor 24 described earlier, and which also employs a transistorized control amplifier 22' in lieu of the control amplifier 22. The control amplifier 22' comprises an NPN transistor 112 having emitter, base and collector electrodes 112e, 112b and 112c, respectively. A bias network is provided for the base 112b and includes a variable resistor 114 and a fixed resistor 116. The junction 115 between these resistors is connected by the lead 98 to the control signal selector 80 of FIG. 5 to receive the output therefrom. When used with the embodiment of FIGS. 1 and 2, however, the series circuit comprising the resistors 114 and 116 is replaced by the control signal generator 20 and no lead such as 98 is used.

The control amplifier 22' further includes a resistor 118 connected to the emitter 112e with a by-pass capacitor 120. A collector load resistor 122 is connected between the collector electrode 112c and ground. Operating potentials for the transistor 112 are provided by a suitable power source 124.

The signal distributor 24' includes a PNP transistor 126 having emitter base and collector electrodes 126e, 126b and 126c, respectively, and also an NPN transistor 128 having emitter base and collector electrodes 128e, 128b, 128c, respectively. An emitter resistor 130 is connected to the emitter 128 and an emitter resistor 131 is connected to the emitter 126e. The emitter resistors 130 and 131 are preferably of equal value, but their specific values will depend upon the characteristics of the transistors 126 and 128. Another emitter resistor 132 is connected in series with the emitter resistor 131 to ground. The resistor 132 is bridged by a biasing potential source 133 to establish a proper bias on the transistor 126, as will be more fully appreciated later. A transformer 134 is provided having its primary 136 connector between the collector 128c and a suitable power source 138 to provide power to the right speaker 28. Another transformer 140 is provided with a primary 142 connected between the collector 126c and another suitable power source 144 to provide power to the left speaker 26. The signal distributor 24 also includes an input transformer 146 having a primary winding 148 for coupling power from the power amplifier 16 to the distributor circuit.

The secondary 150 of the transformer 146 has one end connected to each of the transistor base electrodes 126b and 128b. The other end of the secondary 150 is connected in series with the control amplifier load resistor 122 to ground.

With such a circuit as in FIG. 8 it will be clear that the collector load resistor 122 of the control amplifier 22' is in series in the emitter-base path of both the transistors 126 and 128. Also, the polarities of the voltage drop across the load resistor 122, the emitter transistor 130 and also the emitter resistors 131 and 132 are as indicated in the drawing. Thus it will seem that in the emitter-base path of the transistor 128 the potentials across the resistors 130 and 122 are in series adding relationship, and also that in the emitter-base circuit of the transistor 126 the potentials across the resistors 131, 132 and the resistor 122 are in series opposing relationship. Furthermore, the resistors 130 and 131 are preferably of equal value for best performance of the circuit. Still further, the resistor 132 and power source 133 combination is selected so that the total voltage drop between the emitter 126e and the base 126b has a value equal to that between the emitter 128e and the base 128b for the "equal power" condition, i.e., the condition under which each of the transistor 126 and 128 is biased exactly the same so that equal power is passed by each of the transistors to their respective speakers 26 and 28.

Reference to FIG. 9 will help to illustrate this "equal power" condition and the operation of the circuit of FIG. 8. In the chart of FIG. 9, the "equal power" condition exists when the voltage drop across the load resistor 122 of the control amplifier 22' is 3 volts, at which time the base-emitter voltage is +4 volts on the transistor 126 and −4 volts on the transistor 128. This corresponds to a control signal level from the control signal generator 20 of FIG. 2 or the control signal selector 80 of FIG. 5, which is intended to cause the signal distributor 24' to pass equal power to each of the speakers 26 and 28. For this condition, the apparent sound source will, of course, be located midway between the speakers.

When, however, it is intended to shift the apparent source toward the left speaker 26, the audio-power transmitted from the transformer 146 through the left speaker transistor 126 will be increased due to an appropriate change in the bias potential current in the base-emitter circuit 126b–126e. This is achieved by a positive direction change in the control signal potential on the lead 98 of FIG. 8 of such a value as to increase the collector current from the collector electrode 122c through the load resistor 122. This condition is represented in the chart of FIG. 9 wherein it is indicated that the voltage drop across the load resistor 122 has now increased from 3 volts to 5 volts. This voltage drop change will, of course, change the base-emitter potential on the transistor 126 in a more negative direction so that it has changed from the value +4 volts to +2 volts as seen in the chart of FIG. 9. When the emitter-base voltage on the PNP-transistor 126 is made more negative, the control current increases so that the left speaker 26 now receives more power. However, it will also be apparent that any change in the voltage drop across the resistor 122 will not only increase the conductivity of one of the transistor 126 and 128, but will also decrease the conductivity of the other transistor, since the resistor 122 is in series with the base-emitter circuit of each transistor. Thus, when the potential across the load resistor 122 increased to 5 volts, causing the base-emitter voltage of the transistor 126 to shift from +4 volts to +2 volts, it also caused the base-emitter voltage of the transistor 128 to shift from −4 volts to −6 volts. Since the transistor 128 is an NPN-transistor, this more negative shift in bias decreases the collector current, so that less power is now transmitted from the transformer 146 through the transistor 128 to the right speaker 28. Thus, it will seem that the shift of the apparent signal source between the speakers 26 and 28 is achieved by appropriate bias change on the transistors 126 and 128 resulting from the voltage drop change across the load resistor 122 caused by the change in the control signal potential on the lead 98.

The circuit of FIG. 8 will operate in the reverse manner to that just described to shift the position of the apparent sound source between the speakers from either the middle position toward the right speaker or from a left position toward the right speaker. Thus, let us consider again the situation when the load resistor 122 would have a voltage drop of 3 volts, so that the transistors 126 and 128 would be biased to +4 volts and −4 volts, respectively, as seen in the chart of FIG. 9. Then with a negative direction change in the control signal potential on the lead 98, the collector current through the load resistor 112 will be descreased, causing a smaller voltage drop across the same, such as, for example, 1 volt as seen in FIG. 9. This will change the base-emitter voltage on the transistor 128 from −4 volts to −2 volts, as seen in the chart. This less negative bias change will cause an increase in the collector current of the transistor 128, thus increasing the audio-power transfer from the transformer 146 to the right loudspeaker 28. As before, it will be clear that the potential change on the load resistor to 1 volt will also result in an increase in the positive base-emitter potential on the transistor 126 to +6 volts, thus decreasing its conductivity and the output from the left speaker 26. Thus the position of the apparent sound source between the speakers 26 and 28 has now been shifted toward the right speaker. This process will continue indefinitely in accordance with the variations in the control signal applied to the control amplifier 22'. Preoperation compensation for room acoustics and for variations in amplification differences in the left and right transistor 126 and 128 is provided by an initial setting of the variable resistor 114 until the desired balance is achieved between the speakers 26 and 28. If the control signal generator of FIG. 2 is used, the resistor 32 may be made variable to provide the pre-operation balance.

Although this invention has thus far been described in connected with a recorded program in the embodiments of FIGS. 1 and 5, it is also applicable for use with "live" music. One example of such use is shown in FIG. 10 in which the basic system of FIG. 1 is employed with an electric guitar 160. As those knowledgeable in the art are aware, such an instrument carriers a sound pickup device such as a microphone 126 and this may be used to generate the electric signal corresponding to the music in place of the pickup 12 of FIG. 1, which is then fed to the preamplifier 14. In accordance with the embodiment of the invention seen in FIG. 10, the guitar 160 also carries on the back side thereof a manually operable device 66' of the type illustrated as the device 66 seen in FIGS. 4A, 4B and described above in connection with the first embodiment. The device 66' is similar in all respects to the manually operable device 66 except that the lever 69 of FIGS. 4A and 4B is replaced by an elongated plate 164 in FIG. 10. This plate 164 is mounted to pivot about the point 168 and is of curved cross section, as seen, to accommodate operation by the palm of the hand.

This mechanism 66' is connected by means of the wires 35 to the control signal generator 20 to form a part thereof and when operated produces a control signal for varying the distribution of the musical output from the speakers 26 and 28 in the manner already described. Thus it will be seen that with the arrangement of FIG. 10 the guitar player may add an entirely new dimension to the music from the speakers 26–28. With this embodiment it will be seen that it is possible to vary the musical distribution between the speakers 26–28 in a manner particularly suitable for the type of music and the moods of the player and the audience, since the control device 66' is mounted on the instrument 160 and controlled by the person playing it at the time it is being played. It will be apparent that the embodiment of FIG. 10 can be employed with musical instruments of different types.

In the embodiment of the invention illustrated in FIG. 11, the overall strength of the audio signal as well as the distribution of that signal between the two loudspeakers is varied according to a predetermined, but yet arbitrary pattern. This combined variation of the signal strength as well as the signal distribution between the speakers provides a listening effect that is unique and far different than the one achieved by varying the signal strength of distribution alone.

To this end, the audio signal recorded on a recording medium 170 includes at least two control signals superimposed on the audio signal. The control signals are at different frequencies both of which are above the audio range. One of these control signals is employed as previously described to vary the distribution of the amplified audio signal between the two loudspeakers. The other control signal is employed, as will be described, to vary the overall amplitude of the distributed audio signal by, as herein shown, varying the gain of the audio amplifier 172.

As in the previously described embodiment of the invention, the volume control and distribution control signals may each include at least two signals each of a different frequency above the audio range. Frequency responsive means are provided to enable the listener to select one of the available matching pair of volume and distribution signals.

As shown in FIG. 11, the volume control signals are at super-audio frequencies $F_A$ and $F_B$, whereas the distribution control signals are at different super-audio frequencies $F_C$ and $F_D$. The output of recording medium 170 is applied to the input of a preamplifier 174 where it is amplified and applied to the input of audio amplifier 172. The output of amplifier 172 is applied to the input of a signal distributor 176, which operates in the manner described hereinabove with respect to the previously illustrated embodiments, to vary the distribution of the audio output to a pair of loudspeakers 178 and 180 in accordance with the amplitude pattern of a distribution control signal applied to the distributor at a line 182.

The output of recording medium 170 which includes, in addition to the audio signal, the superimposed volume and distribution control signals, is applied to the input of narrow-band-pass filters 184 and 186 which are tuned respectively to pass only the volume control signals at frequencies $F_A$ and $F_B$. Similarly, the signal from medium 170 is applied to the input of narrow band-pass filters 188 and 190 which are tuned respectively to pass only the distribution control signals at frequencies $F_C$ and $F_D$.

The outputs of filters 184 and 186 are applied to the input of a volume control selector 192, which consists essentially of a selector switch SW-1 having a movable contact which can be manually positioned at either contact A or B. The fixed contact of switch SW-1 is connected to the input of a volume control amplifier 194 which amplifies the volume control signal selected by the operation of the switch. The thus amplified signal is applied to the gain control input of audio amplifier 172 at a line 196. The varying voltage of the volume control signal at line 196 varies the gain of audio amplifier 172 in correspondence to the amplitude pattern of the volume control signal in any of several manners, all of which are conventional per se, and are therefore not further described herein.

The outputs of filters 188 and 190 are applied to the inputs of a distributor control signal selector 198 consisting essentially of a selector switch SW-2, which is preferably ganged, as indicated by the broken line connection 200, to volume control signal selector switch SW-1.

The fixed contact of signal selector 198 is applied to a distribution control signal amplifier 202. The output of amplifier 202 is the distribution control signal at line 182 which is applied to signal distributor 176 to control the distribution of the sound between speakers 178 and 180 in the manner described previously.

In the operation of the sound system of FIG. 11, the listener selects one of the two available positions for the selector switches SW-1 and SW-2. The audio output of loudspeakers 178 and 180 is continuously shifted between the speakers in accordance with the pattern established by the distributor control signal at line 182 while at the same time the volume of the total audio signal applied to the signal distributor 176 varies according to a second random pattern corresponding to the volume control signal applied to the gain control input of the audio amplifier. The overall effect achieved by this simultaneous dual variation of the audio signal is more interesting and offers a greater variety of listening experience than that achieved by the use of either the volume or distribution control signal separately.

To permit an even greater variety of sound, additional gain and balance controls may, as shown in FIG. 11, be incorporated in certain elements of the system. Thus, as shown, audio amplifier 172 includes an additional manual gain control 204 as do volume control signal amplifier 194 as indicated at 206, and distributor control signal amplifier 198 as indicated at 208. In addition, signal distributor 176 may include a manual balance control 210, such as that found on a conventional stereo amplifier, to enable the listener to preset the audio distribution between the speakers. By manually setting manual gain and balance controls 204–210 to different settings, the listener can determine the settings for these controls that are best suited for his listening purposes, taking into consideration, for example, the listening conditions in the surroundings of the system.

Although the basic system of this invention has been described in connection with vacuum tube circuitry, it will be appreciated that transistors may be employed throughout the system. Also, although in connection with the embodiment of FIG. 5, a specific signal selector has been illustrated as seen in FIG. 7, other arrangements may also be employed. Furthermore, tape or other recording media may also be used in lieu of a record.

Still further, when tape is used, separate tracks may be used for the control signals F1 and F2 and these may be on tracks isolated from the track containing the program material. Furthermore, the speakers need not necessarily be positioned to the left and right of the listener, as the unique effects of this invention can also be utilized with one speaker above, and one below, the listener. Also one speaker could be positioned close to the listener and one remote from him.

While the foregoing description sets forth the principles of the invention in connection with several specifically described embodiments, it is to be understood that the description is made only by way of example and not as a limitation of the scope of the invention.

I claim:

1. A system for modifying a sound program comprising means for providing an audio signal; means for amplifying said audio signal and presenting the same as an output signal; signal distributing means connected to said amplifying means for dividing said output signal into two parts [a first speaker connected to said signal distributing means for receiving one of said output signal parts; a second speaker spaced from said first speaker and connected to said signal distributing means for receiving the other of said output signal parts,] *for distribution to first and second spaced speakers;* said signal distributing means including means for increasing the relative amplitude of one of said parts while decreasing the relative amplitude of the other of said parts; said audio signal providing means comprising a recording medium having a program signal within the audio frequency range and a first control signal [having a first frequency outside of the audio frequency range and] having a first preselected and varying [amplitude] pattern *of a parameter thereof* corresponding to a first desired relative distribution of said output signal between [said] *the* speakers, and a second control signal [at a second frequency outside the audio frequency range and different than said first frequency and] having a second preselected and varying [amplitude] pattern *of the same parameter as that of said first control signal and* different than that of said first control signal and corresponding to a second desired relative distribution of said output signal between [said] *the* speakers, said first and second control signals being [superimposed on said program signal and] recorded on a [common] recording path on *the same* recording medium as said program signal; and means operatively interposed between said recording medium and said signal distributing means for [separating said first and second control signals from said program signal and for] coupling said control signals to said signal distributing means, said signal distributing means further including means for selectively applying only one of said first and second control signals to said amplitude decreasing and increasing means, said signal distributing means being responsive to the [amplitude] *variations of said parameter* of said one of said control signals to vary the relative amplitudes of said parts of said output signal in accordance with the varying [amplitude] patterns of *said parameter of* said one of said control signals, whereby a controlled shifting movement of the apparent sound between [said] *the* first and second speakers is created.

2. The system of claim 1, in which said actuating means includes a coil coupled to the output of said control amplifier, and said signal increasing means comprises a resistor coupled in series between said first and second speakers, and a slide arm magnetically coupled to said coil and electrically connected to the output of said audio signal amplifying means for movement along said resistor in response to the amplitude of said first control signal.

3. A sound reproduction system comprising a program source for providing an audio signal and first and second control signals [at first and second frequencies above the audio range and superimposed on said signal], an audio amplifier operatively connected to said source, [first and second sound transducers,] signal distributing means operatively connected to said audio amplifier [and to said first and second transducers] for selectively providing first and second portions of said audio signal to [said] *spaced* first and second transducers respectively, means operatively connected to said source and said audio amplifier for varying the gain of said audio amplifier in accordance with *a predetermined varying parameter of* one of said control signals, and means coupled to said source and said signal distributing means for varying the relative amplitude of said first and second portions of said audio signal in accordance with *a varying parameter of* the other of said control signals.

4. The sound reproduction system of claim 3, in which said source further includes third and fourth *control* signals [at frequencies above the audio range superimposed on said audio signals], first select means for applying one of said first and third control signals to said audio amplifier to vary the gain thereof, and second select means for applying one of said second and fourth control signals to said signal distributing means to vary the relative amplitudes of said first and second audio signal portions.

5. The sound reproductions system of claim 4, in which said first select means comprises [first and second filters] *means* for passing [signals at the frequencies of] said first and third control signals respectively, and first switch means operatively connected between the outputs of said [first and second filters] *control signal passing means* and said audio amplifier, and second select means [including third and fourth filters] for passing [signals at the frequencies of] said second and fourth control signals respectively, and further comprising second switch means operatively connected between the output of said [third and fourth filters] *control signal passing means* and said signal distributing means.

6. The sound reproduction system of claim 5, further comprising a first control signal amplifier operatively connected between said first switch means and said audio amplifier and comprising first manual gain control means, and a second control signal amplifier operatively connected between said second switch means and said signal distributing means and including second manual gain control means.

7. The sound reproduction system of claim 6, in which said signal distributing means includes manually controlled balance control means.

8. The sound reproduction system of claim 3, in which said signal distributing means includes manual balance control means, and said audio amplifier includes manual gain control means.

* * * * *